Fig.1.

June 4, 1940.    H. S. CAMPBELL    2,203,012
ROTARY-WINGED AIRCRAFT
Original Filed June 10, 1937    6 Sheets—Sheet 2

Fig. 2.

INVENTOR
Harris S. Campbell
BY
Synnestvedt & Lechner
ATTORNEYS

June 4, 1940. H. S. CAMPBELL 2,203,012
ROTARY-WINGED AIRCRAFT
Original Filed June 10, 1937   6 Sheets-Sheet 4

INVENTOR
Harris S. Campbell
BY
Synnestvedt & Lechner
ATTORNEYS

INVENTOR
Harris S. Campbell
BY
ATTORNEYS

June 4, 1940.　　　H. S. CAMPBELL　　　2,203,012
ROTARY-WINGED AIRCRAFT
Original Filed June 10, 1937　　6 Sheets-Sheet 6

Fig. 8.

INVENTOR
Harris S. Campbell
BY
Lynnestvedt & Lechner
ATTORNEYS

Patented June 4, 1940

2,203,012

UNITED STATES PATENT OFFICE 2,203,012

ROTARY-WINGED AIRCRAFT

Harris S. Campbell, Bryn Athyn, Pa., assignor, by mesne assignments, to Autogiro Company of America, a corporation of Delaware Application June 10, 1937, Serial No. 147,460
Renewed October 24, 1939

33 Claims. (Cl. 244—18)

This invention relates to rotary-winged aircraft, especially of the type in which the sustaining rotor is adapted to be autorotationally actuated in normal flight. The invention, moreover, has particular reference to an aircraft of the type just noted in which provision is made for driving the rotor, preferably at a speed in excess of the normal autorotational speed, prior to take-off from the ground, and in which the blade incidence may be reduced substantially to zero during application of the drive and, at a high rate of R. P. M., increased to a substantial positive value desirably in excess of the normal autorotational incidence, in order to effect vertical or direct take-off, and finally in which, toward the end of the direct take-off maneuver, the blade pitch returns to its substantially normal autorotational value.

One of the primary objects of the invention is to provide a mechanism accomplishing the foregoing, which mechanism is positively controlled whereby to ensure the desired sequence in change of blade pitch.

The invention also has in view the employment of controllable mechanical and hydraulic devices to accomplish the above, which devices are foolproof in operation, some being automatically controlled under the influence of flight forces.

Another important object of the invention is the provision of means positively locking the blades at the preferred pitch setting for normal autorotational actuation, this means being operative automatically under the influence of centrifugal force toward or at the end of the direct take-off maneuver. In connection with this it is to be noted that the structure of the invention always assures return of the blades to the desired autorotational pitch setting regardless of the rate of rotor revolution at the time of take-off.

Still more specifically, the invention utilizes the action of centrifugal force either on the blade itself or on a weight carried thereby for automatically effecting decrease of pitch of the blades from over-pitch position to the normal autorotational flight position whereby, upon slowing down of the rotor toward the end of the direct take-off maneuver, the reduction in the effect of centrifugal force on the blades or on said weights automatically moves the blades to the proper pitch setting for normal flight.

In accordance with another aspect of the invention, provision is made for control of the operating parts in part under the influence of centrifugal force as aforesaid, and in part by the mechanism actuable by the pilot, without the employment of servo motors or equivalent devices.

How the foregoing, together with other objects and advantages are attained, will be more apparent from a consideration of the following description referring to the accompanying drawings, in which—

Figure 1:
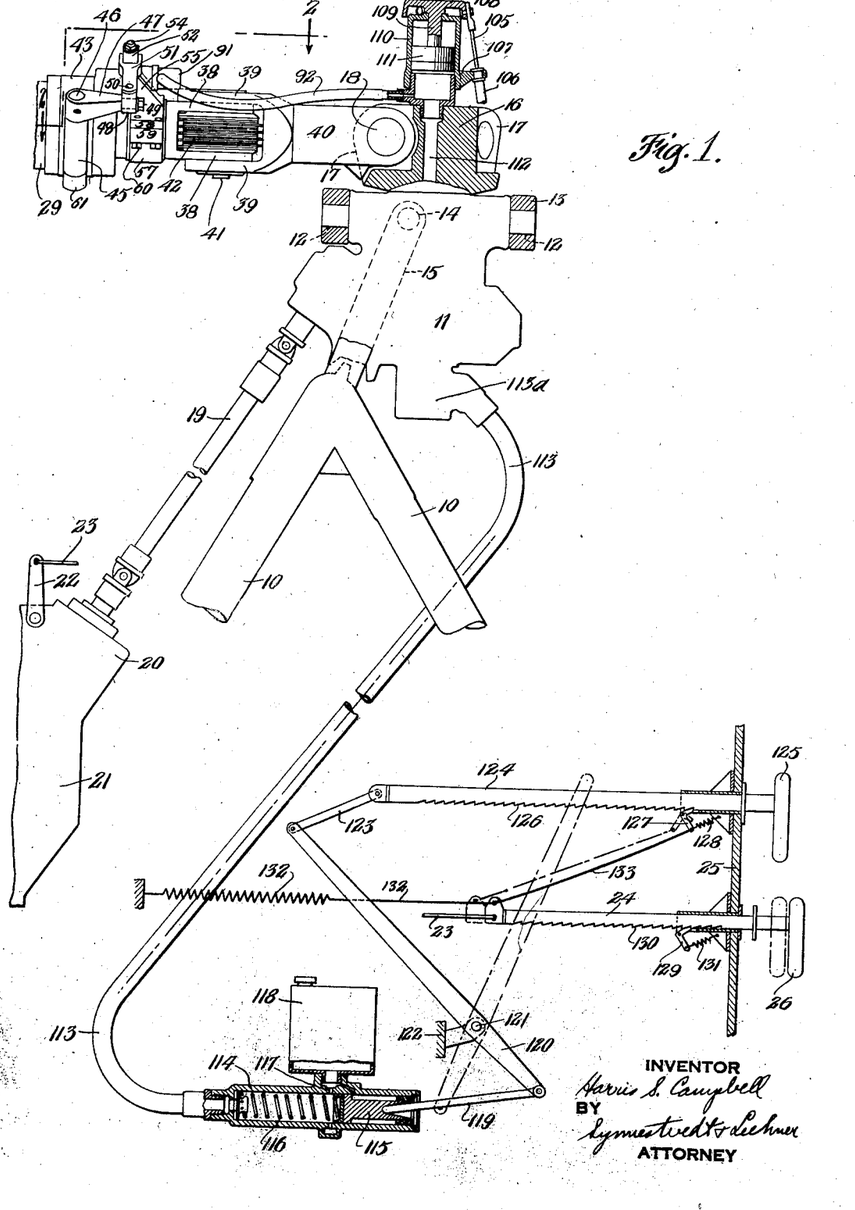
Figure 1 is a side view of a sustaining rotor head and the root end part of one of the blades, a portion of the hub for the blades being shown in vertical section. This view also includes a showing of certain of the control devices, although some of the connections between the control elements proper and the devices actuated thereby are broken out to enable the illustration of these parts in a single view.

Referring first to the embodiment illustrated in Figures 1 to 6 inclusive, and with particular reference to Figure 1, the reference numeral 10 indicates supports for the rotor head or hub assembly. The rotor head includes a non-rotative hub casing 11 mounted as by means of trunnions 12 within the gimbal ring 13 which in turn is carried on trunnions 14 at the upper ends of the prongs 15 of an upright yoke the base end of which is carried by the supports 10 toward the upper ends thereof. This mounting provides freedom for tilting of the hub as a whole in all directions and is employed for the purpose of maneuvering the craft in flight in a manner more fully set out in the copending application of Juan de la Cierva, Serial No. 645,985, filed December 6, 1932.

The rotative hub member 16 projects upwardly from the non-rotative part of the hub 11 and is journalled therein as by means of suitable bearings, not shown. The hub member 16 is equipped with pairs of apertured lugs or ears 17 to which the several blades of the rotor are connected as by means of "flapping" articulations 18.

The rotor is adapted to be driven by means of shafting 19 which is geared at its upper end to the rotating hub part 16, for example in the manner illustrated in the prior patent of Joseph S. Pecker No. 2,045,051, issued June 23, 1936. Toward its lower end the shaft 19 enters the clutch 20 which as here shown is housed in common with the engine 21 employed for forward propulsion of the craft, this arrangement also being illustrated in the prior patent just mentioned. The clutch may be operated by means of an arm 22 and cable 23 which, as seen at the lower right-hand corner of Figure 1 is attached to a longitudinally movable shaft 24 projecting through a suitable support panel 25 and having an operator's handle 26 thereon. Other portions of the control mechanism illustrated in the lower right-hand portion of Figure 1 will be described more in detail hereinafter following a description of the blade mounting on the hub 16.

Figure 2:
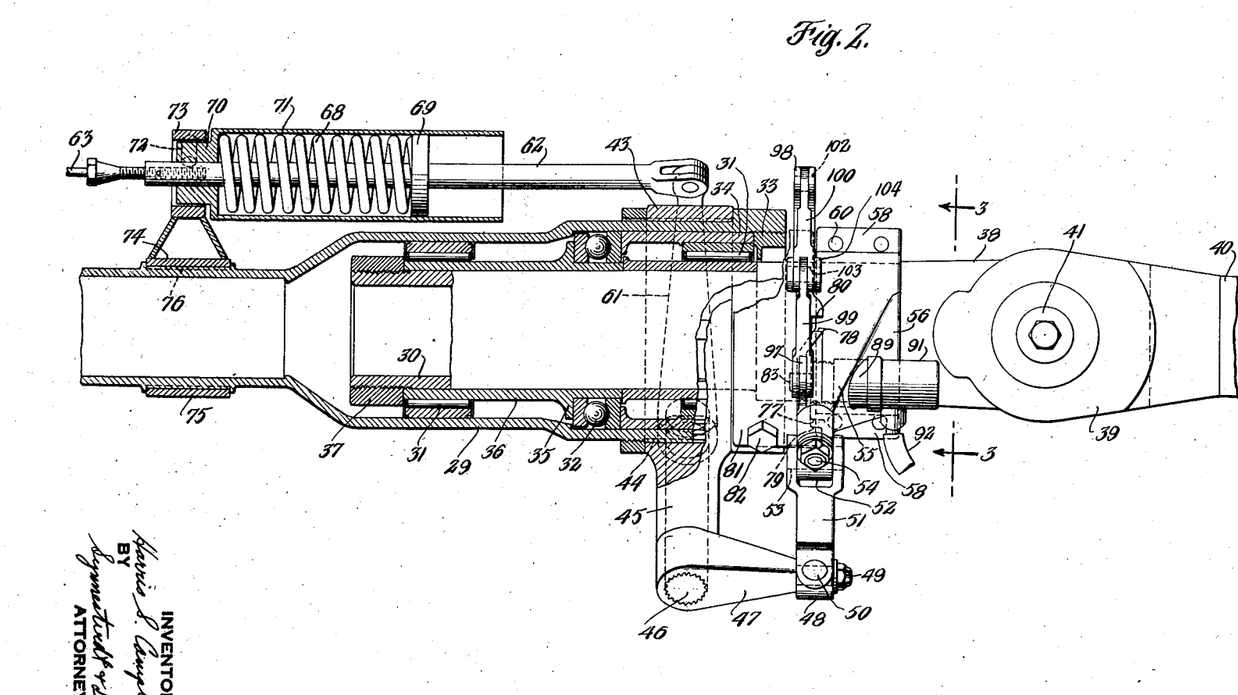
Figure 2 is a top view, on an enlarged scale, of certain of the blade mounting parts shown in Figure 1, some portions of the mounting being illustrated in horizontal section, as is suggested by the section line 2—2 appearing on Figure 1.
Figure 4:
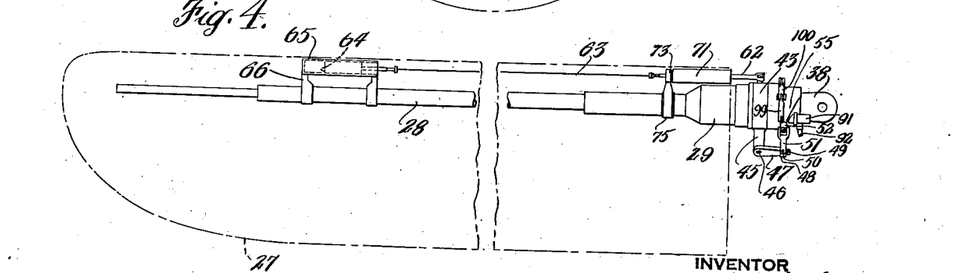
Figure 4 is a top plan view of a blade and mounting mechanism therefor of the type shown in Figures 1 to 3, this view also including a centrifugally operated weight located in the outer region of the blade, the view having the mid-section of the blade broken out.

In considering this mounting, attention is first directed to Figures 1, 2 and 4, in the latter of which the outline of the blade appears in dot-and-dash lines at 27, the mid-section thereof being broken out and it being here noted that the blade is of considerably elongated plan form. The blade is desirably built up on or around a main longitudinal spar 28 having at its inner end a hollow fitting 29 adapted to receive the internal spindle 30, radial bearings 31 being interposed between the telescoped parts 29 and 30. A thrust bearing 32 is also interposed between these parts, the centrifugal load or thrust being transmitted through this bearing from the blade by means of the ring 33 threaded into the inner end of the fitting 29. A collar 34 transmits the thrust to the inner race of the bearing 32 and from the outer race the thrust is delivered to the flange or abutment 35 formed on the sleeve 36. In turn, this sleeve delivers the thrust to the external collar 37 threaded onto the outer end of the spindle 30.

The spindle 30 projects inwardly beyond and through the inner open end of the blade root fitting 29 and is provided with a pair of vertically spaced horizontally apertured lugs 38—38 which are embraced by a similar pair of apertured lugs 39—39 formed at the outer end of the extension link 40. The two pairs of lugs 38 and 39 are connected by means of a pivot 41 serving as a "drag" articulation for the blade. The extension link 40 cooperates with the "flapping" articulation 18 referred to above in description based on Figure 1. A device for controlling blade movements about the drag articulation is desirably associated with the pivot 41, this device being indicated in general by the reference numeral 42. It may here be noted that the blade movement control device just mentioned, and shown more in detail in Figure 7, forms no part of the present invention per se but is described and claimed in copending application of Agnew E. Larsen, Serial No. 106,343, filed October 19, 1936, issued April 25, 1939 as Patent 2,155,427.

The mounting for the blade described above provides freedom for movement under the influence of differential lift and other flight forces about the axes of the flapping and drag pivots 18 and 41. In addition, the telescoped parts 29 and 30, with their interposed bearings, provide for movement of the blade substantially about its longitudinal axis to change the pitch or incidence thereof.

The present invention, as hereinbefore indicated, is chiefly concerned with a blade mounting of this type, i. e., having freedom for pitch change movements, and while I prefer to employ a pitch change pivot substantially coaxial with the longitudinal blade axis, at least some features of the invention are equally applicable to other types of mountings providing for pitch change movements of the blades.

For the purpose of effecting relative rotation of the telescoped parts 29 and 30, these parts are interconnected by a system of levers, as follows:

The outer part or blade root fitting 29 carries a collar 43 (see particularly Figures 1, 2 and 3) splined to prevent rotation as at 44, and having a bracket 45 projecting therefrom. This bracket serves to support and journal a shaft 46 having an arm 47 rigid therewith, the axis of the shaft 46 being substantially perpendicular to the longitudinal blade axis and the axis of the arm 47 generally paralleling the longitudinal axis of the blade. The outer end of arm 47 is coupled as by means of universal joint 48 having pivots 49 and 50, with a link 51 which in turn is coupled by means of another universal 52, having pivots 53 and 54, with an arm 55 carried by a semicircular bracket 56 adapted to be clamped to the inner member 30 of the pitch change mounting by means of a cooperating semi-circular bracket 57, the two brackets having lugs 58—58 and 59—59 adapted to be bolted together as at 60. In connection with the foregoing note the phantom outline of some of these parts appearing in Figure 6.

From the foregoing it will be seen that relative rotation of the parts 29 and 30 to effect pitch change movement of the blade may be effected by rotating the shaft 46 which is journalled in the bracket 45 carried on the outer member 29.

Figure 3:
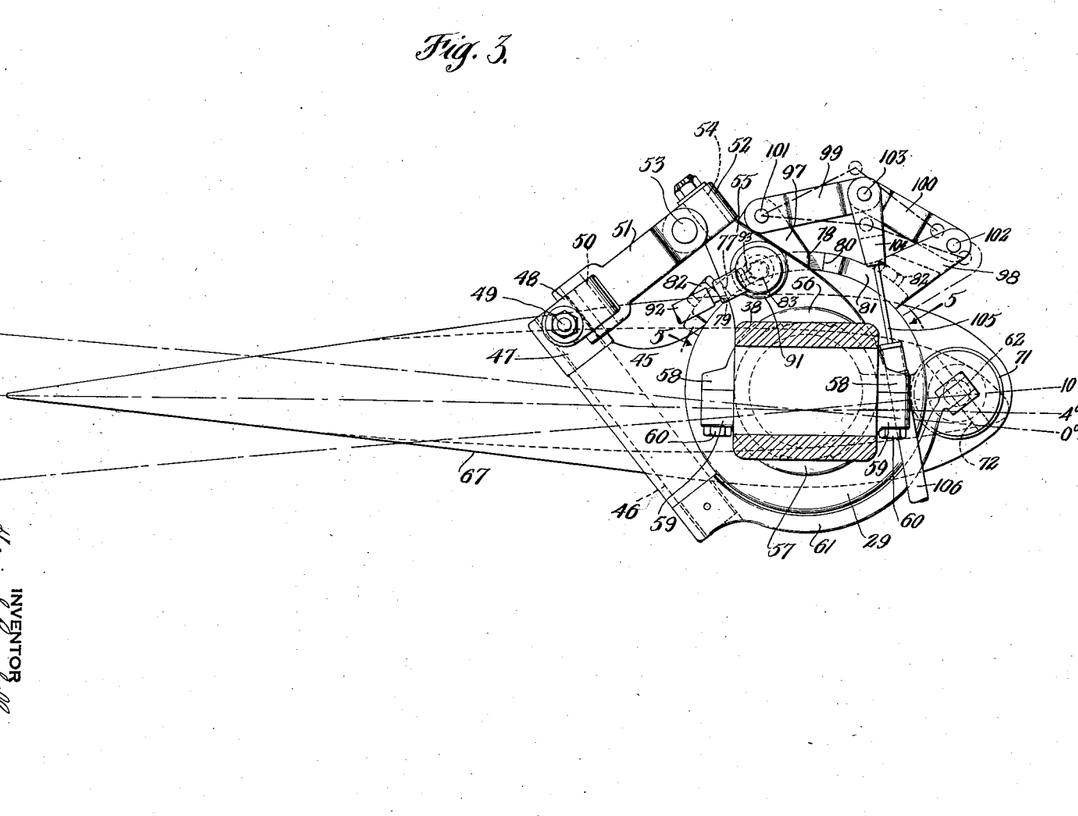
Figure 3 is a transverse sectional view through the blade mounting taken approximately on the section line 3—3 shown on Figure 2.

The mechanism for moving the blade about the axis of the pitch change pivot includes a lever 61 fixed to the lower end of shaft 46 and curved around the lower portion of the root end fitting 29 of the blade, as clearly appears in Figure 3. The opposite end of this lever is coupled as by means of a link 62 and a cable 63 (see Figures 2 and 4) with a weight 64 slidably mounted in a sleeve 65 carried as by bracket 66 on the spar of the blade 28 in a region close to the tip, this location being chosen since the centrifugal force on only a relatively small weight will be sufficient to effect the desired control. It will be noted that the weight is also located toward the leading edge of the wing, this being preferable in order to maintain the sectional center of gravity of the wing well forward.

The action of centrifugal force on this weight tends to move the lever 61 to the left, as viewed in Figure 2, which movement causes arm 47 to react against link 51 and the arm 55 which is carried by the internal mounting part 30, but since this internal mounting part, being connected to the hub through the drag and flapping pivots, cannot rotate, the result is rotation of the outer blade mounting part 29 in a counterclockwise direction when viewed as in Figure 3, i. e., in a direction to increase the incidence or pitch setting of the blade shown in full lines in Figure 3 at 67.

Thus the normal tendency of the action of centrifugal force on the weight 64 is to cause the blade to move from a lower to a higher pitch position and the force tending to effect this movement is dependent upon the speed of rotation of the rotor. Working in opposition to this force I have provided a compression spring 68 which reacts between an abutment 69 carried by link 62 and the base end 70 of a cylindrical housing 71 for the spring. The base end of the housing 71 is mounted by means of a pivot 72 within a ring 73 carried by a split bracket including parts 74 and 75 embracing an outer portion of the root end fitting 29 of the blade and splined thereto as at 76.

The spring 68 thus tends to move link 62 to the right when viewed as in Figure 2, and through the linkage hereinbefore described this movement causes rotation of the blade substantially about its longitudinal axis in a clockwise direction (when viewed as in Figure 3), so that the spring constantly urges the blade from a higher to a lower pitch position. The axis of pivot 72 at the base end of the spring cylinder 71 is preferably arranged substantially parallel to the axis of shaft 46 on which operating levers 61 and 47 are mounted. With this parallel relationship between the axes, the spring cylinder and link 62 may swing, without binding, with lever 61 during operation of the mechanism.

In considering the foregoing mechanism for moving the blade to different incidence positions it should be noted that in accordance with this invention the spring 68 and the weight 64 are so proportioned and located that at a rate of revolution of the rotor approximating the normal autorotational flight speed, the spring 68 is of sufficient force to overcome the effect of centrifugal force on the weight 64, with the result that at this R. P. M. (normal autorotational rate) the spring 68 tends to move the blade from a higher to a lower pitch position. At rates of rotation substantially in excess of the normal autorotational rate, the effect of centrifugal force on the weight 64 overcomes the effect of the spring 68, with the result that there is a force set up to move the blade from a lower to a higher pitch position.

In effecting the direct or jump take-off maneuver, it is desirable that during driving of the rotor prior to take-off, the pitch of the blade shall be substantially zero, or at least a very low value such that the drag of the rotor is reduced and that the effective lift incidence is insufficient to raise the craft from the ground even when driving the rotor substantially in excess of the normal autorotational rate. With the mechanism so far described, it is apparent that the weight 64 would tend to move the blade to a positive pitch setting during acceleration of the rotor past the normal autorotational rate. The invention therefore provides means for holding the blade in low pitch position as against the action of centrifugal force on the weight 64 during application of the drive, and this mechanism will be described just below.

Before proceeding with that description, however, it is further noted at this point that following initial "revving" up of the rotor before direct take-off it is desirable that the pitch of the blade shall be increased to the direct take-off setting, in this case, about 10° positive lift incidence, this and also the zero lift position being indicated in Figure 3. For this purpose the invention incorporates control means for releasing the means holding the blade at zero lift and for effecting this release preferably substantially at the moment of disconnection of the drive.

During the direct take-off maneuver the speed of the rotor decreases, and when it approaches the normal autorotational rate the spring 68 then becomes effective to overcome the action of centrifugal force on the weight 64 and this causes the blade to move from the maximum lift position to a lower pitch position.

For normal autorotational flight, the pitch setting should preferably be intermediate the maximum of 10° and the zero position (for example, 4°—see Figure 3), and with this in view the invention provides a positive but releasable lock for arresting movement of the blade in a direction to decrease pitch at the autorotational value desired. Normal translational flight and flight maneuvers may then be accomplished, including landing, either oblique or substantially vertical.

Figure 5:
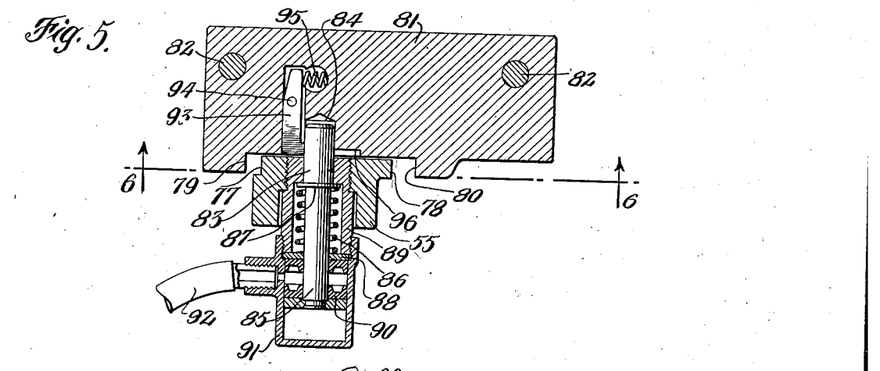
Figure 5 is an arcuate sectional view of certain operating and controlling parts of the blade mounting, taken as shown by the section line 5—5 on Figure 3.
Figure 6:
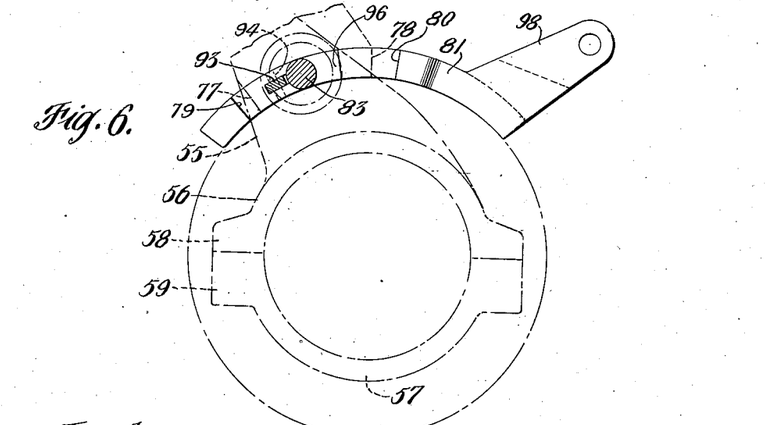
Figure 6 is a view of certain parts shown in Figure 5, this view being taken as indicated by the line 6—6 on Figure 5.

The mechanism for bringing about the proper control and sequence as to pitch change movements and the like is as follows:

First, in order to set definite limits for the total range of pitch change movement, the arm 55 which is carried by the inner pitch pivot element 30, is provided with laterally projecting shoulders 77 and 78 adapted to abut, respectively, complementary shoulders 79 and 80 formed on an arcuate plate 81 which appears to best advantage in Figure 5, this view being a projected sectional view of various of these parts taken as indicated by the arcuate line 5—5 on Figure 3. The plate 81 is securely fastened as by studs 82 to the inner portion of the root end fitting 29 for the blade. The foregoing arrangement provides definite limits for pitch change movement, the position in which abutments 77 and 79 are in contact representing zero lift incidence or low pitch and the position in which abutments 78 and 80 are in contact representing maximum pitch.

The normal autorotational flight position lies intermediate these two limits and is the position in which the parts are shown in full lines in all views of the drawings. As seen in Figure 5, the lock includes a plunger 83 adapted to be received in a bore 84 formed in the edge of the arcuate plate 81. The plunger stem 85 is surrounded by a compression spring 86 reacting against the abutment 87 carried by the plunger and also against an annular element 88 which is fixed with respect to the spring mounted plunger 89. The spring thus constantly urges the plunger 83 in a direction to enter the recess 84. For the purpose of releasing the plunger, the stem 85 also carries a piston 90 working in a small cylinder 91 and adapted to receive fluid from a control system, preferably of the hydraulic type, through the connection 92, which control system is operative under some conditions to withdraw the plunger 83 from its cooperating recess 84.

As hereinbefore mentioned, during the direct take-off maneuver it is desirable that the blade change from substantially zero lift incidence setting all the way to direct take-off incidence. In order to provide for this, a latch device 93 is pivoted as at 94 in a recess formed in the arcuate plate 81, the latch being urged about its pivot in a counterclockwise direction, when viewed as in Figure 5, by means of a compression spring 95. The head of this latch is positioned so that with the blade at zero incidence, the head of plunger 83 bears against the latch. In view of this, upon movement of the blade to high incidence position, the latch pivots about the point 94 and carries the plunger 83 beyond the recess 84 therefor until the head of the plunger comes to rest on the lower surface 96. Thus when moving from low pitch to high pitch position the plunger 83 cannot enter the locking recess 84.

On the other hand, when the blade moves from high pitch to low pitch the plunger 83 engages a side of the latch 93 and displaces this latch to the position shown in Figure 5, in which position the plunger may then enter the recess 84 and lock the blade at the autorotational incidence setting.

For the purpose of retaining the blade in substantially zero pitch position during application of the drive, the arm 55 which is rigid with the internal pitch pivot part 30 is formed with an apertured ear 97, and similarly the arcuate plate 81, which is rigid with the external pitch pivot part 29 is formed with an apertured ear 98, and a pair of toggle links 99 and 100 interconnect the ears 97 and 98. As seen in Figure 3, these toggle links are connected to the respective ears 97 and 98 by means of pivots 101 and 102 and are interconnected by pivot 103, which latter pivot serves to carry a forked actuating element 104 which, upon being drawn downwardly causes the toggle links to flatten and thus force the ears 97 and 98 away from each other, with the result that the blade mounting parts are moved to cause the blade to assume substantially zero pitch position. The toggle links and the abutments 77 and 79 limiting blade pitch movement in the negative direction are so arranged that the links approach but do not pass dead center. In this position only relatively light force on the operating member 104 is necessary in order to maintain the blade pitch at substantially zero setting.

The control fork 104 constitutes the terminal connection for a flexible cable 105 carried in a flexible sheath 106 which is extended (see Figure 1) inwardly for support on the hub above the plane of attachment of the blades, as at 107. At this point the flexible cable 105 emerges from the sheath 106 and is attached to a fitting 108 at the top of the hub, which fitting is carried by the piston stem 109 projecting through the end of the upright cylinder 110. Inside this cylinder the stem 109 is connected with the piston 111 so that upon admission of fluid pressure to the cylinder below the piston the actuating cables 105 for the several blades are drawn upwardly, with the result that these cables exert a downward pull on brackets 104 and also on the toggle links 99 and 100, this downward movement of the toggle links in turn causing the blades to move to substantially zero pitch position.

The hydraulic connection 92 (hereinbefore mentioned in connection with Figure 5) also extends inwardly to the hub and is connected with the cylinder 110 below the piston 111. The cylinder is provided with connection 112 extended downwardly therefrom through the central part of the hub, and at the bottom this connection communicates with flexible tubing 113 which extends downwardly into the body of the craft to the actuating cylinder 114. A rotating pressure connection 113a of the general type described below in connection with Figure 7 may be interposed between passage 112 and tube 113. Cylinder 114 has a piston 115 mounted therein and normally urged to the right when viewed as in Figure 1 by means of a spring 116. The cylinder is supplied with fluid through port 117 from the reservoir 118. The right end of the cylinder 114 is open to pass the operating rod 119 which engages the right end of piston 115. The rod 119 is in turn actuated by a lever 120 pivoted as at 121 to a fixed part 122. The other end of this lever is connected as by a link 123 with the push-pull operating element 124 mounted in the control panel 25 and having a control handle 125. The push-pull rod 124 has a series of ratchet teeth 126 which engage a pivoted bellcrank latch 127 in order to retain the rod 124 in the position in which it is pulled out (at the right when viewed as in Figure 1). Spring 128 maintains the latch 127 in position to engage the teeth 126.

From the foregoing it will be seen that when the pilot pulls on handle 125, the piston 115 is caused to move to the left in cylinder 114 with the result that the port 117 is closed and hydraulic pressure is transmitted through tube 113 upwardly through the hub and into the cylinder 110. Handle 126 should be drawn out slightly prior to operation of handle 125 in order to condition the latch 127 for its proper operation. The pressure set up by drawing on handle 125 is transmitted through the connections 92 which are extended to the releasing devices for the locking plungers 83, and upon release of the locking plungers the pressure in cylinder 110 moves piston 111 upwardly and in consequence actuates the toggle levers 99 and 100 to cause the blades to move to zero pitch position.

The clutch operating handle 26 is then pulled out by the pilot, and this actuates the clutch 20 by means of the cable 23 and lever 22 in order to engage the clutch and initiate rotation of the rotor. As the clutch handle 26 is drawn out the bellcrank latch 129 engages ratchet teeth 130 formed on the push-pull rod 24 and thus maintains the clutch engagement at any desired value. Engagement of the latch is maintained by spring 131.

When the rotor attains a speed in excess of the normal autorotational rate, the clutch handle 26 is then released, this being accomplished by rotating the handle in order to disengage the latch 129, and the return spring 132 then draws the push-pull rod 24 inwardly to disengage the clutch. A flexible cable interconnection 133 is attached at one end to the push-pull rod 24 and at its other end to the latch 127 for the push-pull rod 124. This cable is so arranged that it trips latch 127 approximately at the end of the inward movement of clutch handle 26. The tripping of the latch now permits the action of centrifugal force on the weights 64 in the several blades to overcome the effect of springs 68 and to cause the blades to move from zero pitch position to direct take-off pitch position. Since the toggle levers 99 and 100, even with the blades in zero pitch position, do not come quite to dead center, these levers move upwardly when viewed as in Figure 3 in order to permit increase of blade pitch. At this time the piston 111 in cylinder 110 at the top of the rotor head moves downwardly, and the fluid forces piston 115 in the actuating cylinder 114 to the right.

Toward the end of the direct take-off maneuver, when the rotor speed has decreased to about the normal autorotational rate, the effect of centrifugal force on the weights 64 diminishes, with the result that the springs 68 cause the blades to move from the high pitch to a lower pitch position, and during this movement the locking plungers 83 enter the cooperating bores 84 and thus lock the blades in the desired normal flight pitch position.

In considering the foregoing, especial attention is called to the fact that the several control operations are all accomplished without reliance upon any engine operated servomotor devices and also to the fact that movement of the blade from zero pitch to direct take-off pitch and from direct take-off pitch back to the intermediate normal flight pitch, is accomplished automatically. These features, of course, are of considerable importance in maintaining a high factor of safety.

Figure 7:
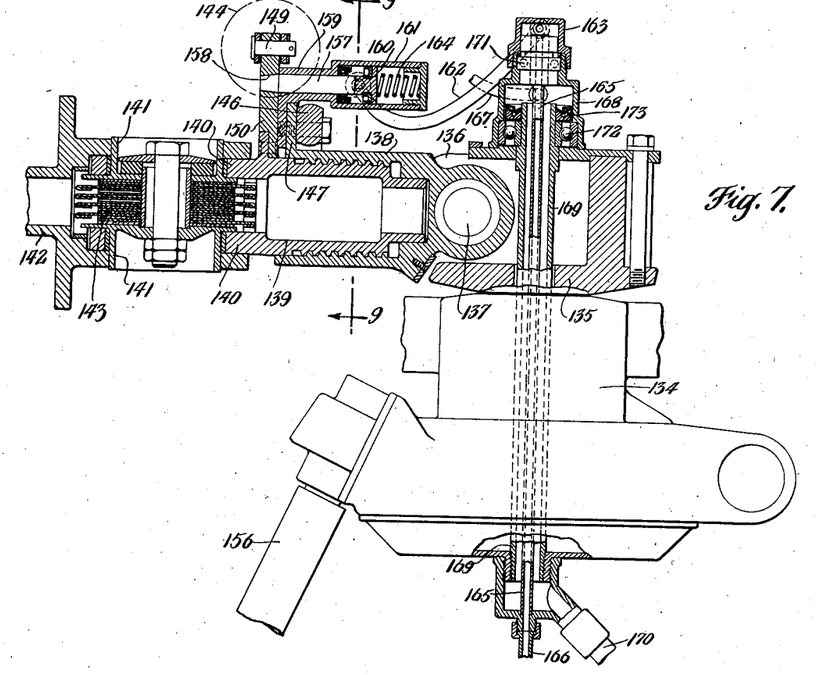
Figure 7 is a view of a rotor head, including a hub and an associated blade mounted thereon, incorporating modified structure, as compared with the arrangement of Figures 1 to 6 inclusive.
Figure 8:
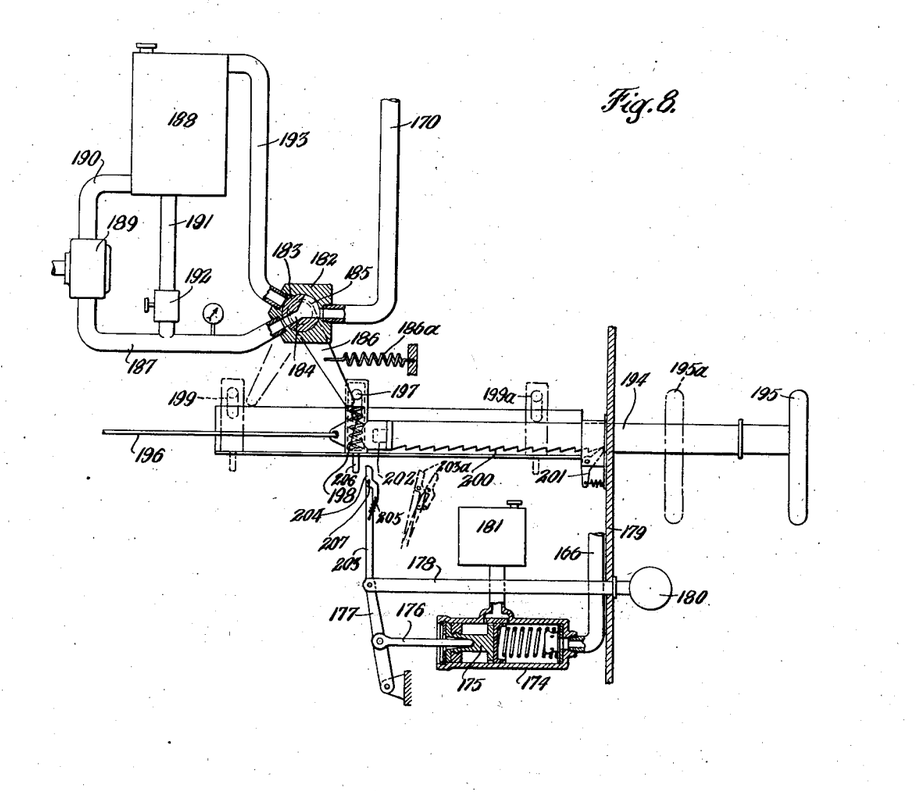
Figure 8 is a somewhat diagrammatic view of controlling mechanism and operating parts adapted to be associated with a mechanism of the type shown in Figure 7.
Figure 9:
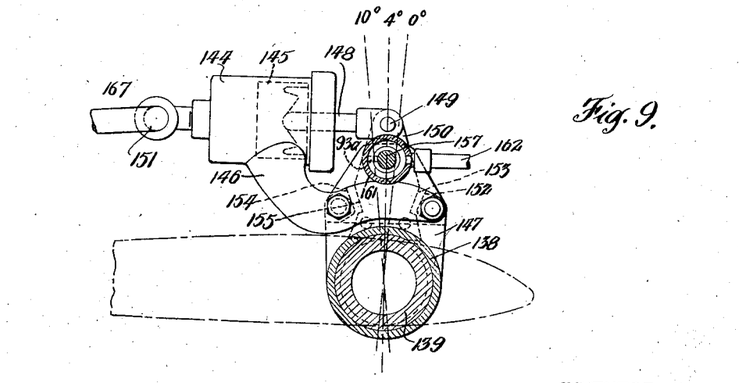
Figure 9 is a transverse sectional view through the blade mounting of Figure 7 taken as shown by the section line 9—9 thereon.

In the arrangement shown in Figures 7, 8 and 9 the non-rotative hub structure appears at 134, the rotative hub part 135 projecting thereabove and being provided with pairs of apertured lugs 136 cooperating with flapping pivots 137 to mount the extension link devices 138 for the blades. As clearly seen in Figure 7, each device 138 is internally threaded to cooperate with an externally threaded member 139 which projects outwardly therefrom and is provided with horizontal vertically spaced and apertured lugs 140—140 for cooperation with pivot parts 141 constituting a drag pivot for connecting the root end 142 of the blade to the hub. A damper device 143 is associated with these pivot parts in the manner briefly mentioned above and more fully described and claimed in the copending application of Agnew E. Larsen, fully identified above.

Because of the employment of cooperating screw threaded parts 138 and 139, the blade has freedom for pitch change movement substantially about its longitudinal axis, which pitch change movement is accompanied by axial displacement of the blade, this being the type of movement also provided by the mechanism of copending application Serial No. 91,838 of James G. Ray, filed July 22, 1936.

In accordance with the present invention, however, the range of movement of the blade mounting parts is such as to provide for pitch change from a position of zero pitch up to a position in excess of the normal autorotational flight incidence. Movement of the blade from a low pitch to a high pitch position is accomplished by the action of centrifugal force on the blade itself, and movement in the opposite sense is accomplished by means of a hydraulic cylinder and piston device 144 and 145, the former of which is mounted as by a bracket 146 on the external blade mounting part 138, a plate 147, rigid with member 138, being provided for this purpose. The piston element 145 acts on the stem 148 which is pivotally connected as at 149 with the bracket 150 carried by the internal blade mounting part 139. Thus upon admission of fluid to the cylinder 144 through the connection 151, the piston and cylinder are relatively moved to cause the blade to move from a higher to a lower pitch position.

The limits of pitch change movement are defined by cooperating abutments 152 and 153 (limiting movement in the negative direction) carried respectively by members 147 and 150,
and by abutments 154 and 155 (limiting movement in the positive direction) carried respectively by members 147 and 150.

Preferably, the coefficient of friction of the interengaging threads on members 138 and 139 and the pitch of the threads, is so arranged with relation to the force exertable by the cylinder and piston device 144—145 that the latter device is effective to retain the blade as against the action of centrifugal force at substantially zero pitch setting even during driving of the rotor at a speed substantially in excess of the normal autorotational speed. These several parts, however, are so arranged that the fluid pressure device is inoperative to move the blade from a higher to a lower pitch position at rates of revolution of the rotor higher than the normal autorotational rate, this being of importance as a safety factor, as will appear more fully hereinafter in connection with the control system for the form of Figures 7, 8 and 9.

The blade may be maintained at substantially normal autorotational pitch or incidence by means of a locking device essentially similar to that described above particularly in connection with Figures 5 and 6. Portions of this mechanism appear in Figures 7 and 9. For example, a locking plunger appears at 157, this plunger being adapted to enter the cooperating bore 158 formed in bracket 150. The plunger is carried by a support 159 mounted on the upright flange 147 which is rigid with the external blade mounting part 138. The plunger is provided with a piston 160 working in a cylinder 161 supplied with operating fluid through flexible tube 162 extended outwardly from the chamber 163 at the top of the hub. A spring 164 within the cylinder 161 serves to normally urge the locking pin 157 into locking position.

Fluid is supplied to the chamber 163 through a central tube 165 extended downwardly through the rotor hub and communicating at its lower end with a pipe 166 mentioned again herebelow.

For the purpose of supplying fluid to the cylinder 144, a connection is extended inwardly from the pipe 151 to a suitable connection 167 entering chamber 168, which chamber is supplied through the tube 169 surrounding the central tube 165, in spaced relation, and communicating at its lower end with the pipe 170. Preferably, both of the fluid supply tubes 165 and 169 are non-rotative and are provided with bearings 171 and 172, respectively, toward their upper ends so as to ensure free rotation of the hub part 135 and the casings 163 and 168 for the pressure chambers at the top of the hub. Pressure sealing rings such as shown at 173 are preferably employed adjacent to the bearings 171 and 172.

An upwardly extending drive shaft for imparting drive to the rotor is indicated in Figure 7 at 156.

Turning now to Figure 8, it will be noted that the pipe 166 communicates with an operating cylinder 174 having a piston 175 therein somewhat similar to the lock releasing piston 114 of the form of Figure 1. The piston 175 in this case is operable by a rod 176 and lever 177, through the medium of a link 178 extended through the control panel 179 and provided with a control knob 180. Fluid may be supplied to the operating cylinder 174 from a suitable reservoir 181, as in the form previously described. Upon pulling the operating knob 180, the piston 175 is moved in cylinder 174 in order to create pressure and transmit it through the connection 166 upwardly to and through the hub and into chamber 163 which withdraws the locking pin 157 from the aperture 158.

The other fluid pressure connection shown on Figure 7 (170) extends downwardly and is coupled, as shown in Figure 8, with a valve device 182 having a valve rotor 183 with a passage 184 therein flared at one end as at 185. This valve is operated by a lever 186 normally urged to the right by a spring 186a, and in one position (position shown in Figure 8) the valve serves to couple the pipe 187 with the connection 170 extended upwardly to the rotor hub. A reservoir 188 supplies fluid for this control system, and a pump 189 receives fluid from reservoir 188 through pipe 190 and passes the same through the pipe 187 to the valve and thence to the connection 170. Excess liquid may be recirculated through the pipe 191 and relief valve 192.

In the other position, the dot-and-dash position of Figure 8, the lever 186 causes the valve member 183 to interconnect the pipe 193 and the connection 170 which extends upwardly to the hub. In this position the pressure in chamber 168 at the top of the hub and the connected passages will be relieved since the connection 170 is in communication, by means of pipe 193, with the reservoir 188 which is at low pressure.

A push-pull rod 194 having a handle 195 serves to control the rotor drive clutch as by means of cable 196, in a manner similar to that described above in connection with the first form.

In its innermost position (the dot-and-dash showing at 195a) the clutch is disconnected, and carried at the inner end of the push-pull rod 194 there is an element 197 urged upwardly by spring 198, this element normally being positioned so as to engage the valve operating lever 186. In the inner position of handle 195, these parts are located as shown in dot-and-dash lines at 199, so that upon drawing the push-pull tube 194 out the element 197 will snap under the valve lever 186 and may move to the position shown at 199a. The outer portion of the stroke of member 194 is the only part of the stroke which is effective to control the degree of engagement of the clutch, and in this range the ratchet teeth 200 cooperate with the spring-pressed pawl 201 to maintain any desired degree of clutch engagement.

The arrangement of Figure 8 also provides for automatic release of the locking pin 157 when the clutch handle 195 is drawn outwardly to engage the clutch. This mechanism includes an upward extension 203 of lever 177 carrying a displaceable abutment 204 normally retained in the position shown in full lines by means of spring 205. The abutment is adapted to be engaged by the cooperating part 206 carried by the terminal fitting at the inner end of the push-pull rod 194 for the clutch, so that upon drawing out the clutch operating handle 195 the element 206 engages an abutment 204 and moves lever 203—177 to the right in order to transmit pressure through connection 166 upwardly to the locking pin to release the same. At about the point indicated by the dot-and-dash showing 203a, the element 206 becomes disengaged from the abutment 204, this action being facilitated by making the lever 203 of reasonable flexibility, particularly in its lower portion. Upon return of the clutch operating handle the element 206 may readily displace the abutment 204 about its pivot 207.

Considering the operation of this control system, assume first that the clutch operating handle 195 is in the position shown at 195a (release position for the clutch) and that it is desired to effect the direct take-off maneuver. For this purpose the clutch handle 195 is drawn outwardly, an initial part of the movement actuating lever 203—177 in order to release the locking pin. Alternatively, the locking pin may be released by pulling on the knob 180 momentarily. In either event, as the clutch handle is drawn out, the element 197 is displaced to pass under lever 186 and the degree of clutch engagement desired is maintained by means of ratchet teeth 200 engaging the retaining pawl 201. During application of the drive the pump 189 supplies pressure through valve 182 to connection 170, which pressure is delivered to chamber 168 at the top of the rotor hub and from there to the operating cylinders 144 which cause the blades to move to substantially zero pitch position and to maintain that position. Upon the attainment of a speed of rotation substantially in excess of normal flight speed, the clutch lever is pushed inwardly, which may be accomplished by rotating the handle 195 so as to disengage the teeth 200 from the pawl 201. Such rotating is permitted by the rotative connection 202. Upon reaching the position shown in full lines in Figure 8, the element 197 engages the valve operating lever 186 and moves this valve so as to connect pipe 170 with the pipe 193 leading to the reservoir 188. During this portion of the inward movement of the clutch controlling lever the pressure in cylinders 144 is released, and in consequence, the action of centrifugal force on the blades forces the blades outwardly so that they advance to direct take-off pitch, the latch 93a (see Figure 9) operating to prevent engagement of the lock during this movement, as in the arrangement of Figure 5. As the clutch operating element approaches the inner end of its movement, the element 197 is again released from valve lever 186 (as indicated at 199 in Figure 8) and the spring 186a returns the lever 186 to the full line position of Figure 8 in which pressure is again transmitted to the operating cylinders 144. Because of the presence of pressure in these cylinders, as the rotational speed of the rotor decreases to the substantially normal autorotational rate, the blades are caused to move against the action of centrifugal force from the direct take-off pitch position to the intermediate normal autorotational pitch setting, and when that value is reached the locking pin 157 again enters the cooperating bore in order to maintain the blade at the desired setting for normal autorotational flight.

A return spring for the clutch operating element similar to that shown at 132 in Figure 1 may also be applied to the arrangement of Figure 8 in order to ensure complete release of the clutch and thus proper sequence of operation of the valve 182.

It is particularly noted in connection with Figure 8 that the parts are arranged so that upon releasing movement of the clutch control, the clutch is completely disengaged before the element 197 actuates lever 186 to permit release of pressure in cylinders 144.

The mechanism of Figures 7, 8 and 9 is of especial advantage in making possible the employment of a very simple blade mounting arrangement to accomplish pitch change. This type of mounting, incorporating the cooperating threaded parts 138 and 139, is also of advantage since movement of the blade from a lower to a higher pitch position is automatically brought about under the influence of centrifugal force on the blade itself.

As to both forms of mechanism, the action of centrifugal force is relied upon to increase the incidence of the blades. In flight, therefore, there is no possibility for a reduction of blade pitch to zero.

Both forms of the mechanism are also of advantage since they incorporate a mounting for the blades providing positive movement thereof to predetermined fixed pitch positions including a position of substantially normal autorotational pitch from which the blade cannot be disturbed in subsequent flight operation by aerodynamic forces. Both mechanisms furthermore provide for "overpitching" for the purpose of effecting direct take-off and for automatic reduction of pitch from the high direct take-off pitch to the normal autorotational pitch.

With respect to both embodiments of the invention it may be noted that a number of advantages, including the obtaining of overpitch followed by a return to normal pitch, the raising of pitch under the influence of centrifugal force, the return to normal pitch automatically upon reduction of rotor R. P. M. to approximately normal autorotational speed, and the automatic and positive locking of the blades at normal pitch, are secured in association with blade pivot mechanism which is independent of the blade flight pivots. Thus the arrangement, location and angularity of the flight pivots can be chosen to best suit the desired blade action for flight, and there need be no compromise in this respect between the jump take-off and the normal flight characteristics of the machine.

I claim:

1. In an aircraft, a sustaining rotor including a hub, and a blade mounted thereon with freedom for pitch change movement substantially about its longitudinal axis between a position of substantially zero lift incidence and a position of appreciable positive lift incidence, disconnectible means for driving the rotor, means for setting the blade at substantially zero lift incidence during application of the drive, means operative under the influence of centrifugal force for moving the blade to a positive lift incidence position upon disconnection of the drive, and means for moving the blade to and maintaining the blade at a predetermined intermediate positive lift incidence position.

2. In an aircraft, a sustaining rotor including a hub, and a blade mounted thereon with freedom for pitch change movement substantially about its longitudinal axis between a position of substantially zero lift incidence and a position of appreciable positive lift incidence, disconnectible means for driving the rotor, means for setting the blade at substantially zero lift incidence during application of the drive, means operative under the influence of centrifugal force for moving the blade to a positive lift incidence position upon disconnection of the drive, and means for moving the blade to and maintaining the blade at a predetermined intermediate positive lift incidence position, said last means being operative automatically at rates of R. P. M. lower than maximum to move the blade in the negative pitch direction in opposition to the action of centrifugal force on the means for moving the blade in the positive pitch direction.

3. In an aircraft, a sustaining rotor including a hub, and an autorotationally actuable blade mounted on the hub with freedom for pitch change movements substantially about the longitudinal axis of the blade between a position of substantially zero pitch and a positive or direct take-off setting greater than the normal autorotational incidence, disconnectible means for driving the rotor with the blade in the zero pitch position, means for moving the blade to the direct take-off pitch setting under the influence of disconnection of the drive, and means automatically operative under the influence of decrease of R. P. M. of the rotor appreciably below the maximum driven speed for moving the blade to the normal autorotational pitch setting.

4. In an aircraft, a sustaining rotor including a hub, and an autorotationally actuable blade mounted on the hub with freedom for pitch change movements substantially about the longitudinal axis of the blade between a position of substantially zero pitch and a positive or direct take-off setting greater than the normal autorotational incidence, means for driving the rotor at a rate higher than the normal autorotational rate with the blade in the zero pitch position, means acting under the influence of centrifugal force for moving the blade to the direct take-off pitch setting when the rotor is rotating at a higher than normal autorotational rate, and means for moving the blade to a predetermined normal autorotational pitch setting when the rotor is rotating at approximately its normal autorotational rate.

5. In an aircraft, a sustaining rotor including a hub and a blade, mounting means for the blade providing freedom for pitch change movement thereof substantially about its longitudinal axis, means operative under the influence of centrifugal force and tending to move the blade from a lower to a higher pitch setting, a device tending to move the blade from a higher to a lower pitch setting, and a releasable latch device for maintaining the blade at a pitch setting intermediate the limits of the range provided.

6. In an aircraft, a normally autorotationally actuable sustaining rotor including a hub and a blade, mounting means for the blade providing freedom for pitch change movement thereof substantially about its longitudinal axis between a position of substantially zero lift and a position of positive pitch for direct take-off greater than the normal autorotational pitch setting, means operative under the influence of centrifugal force tending to move the blade from a lower to a higher pitch setting, a device tending to move the blade from a higher to a lower pitch setting, mechanism for driving the rotor at a higher than normal autorotational rate, means for holding the blade at substantially zero pitch position against the action of centrifugal force during application of the drive, and means for releasing said holding means when the drive is disconnected.

7. In an aircraft, a normally autorotationally actuable sustaining rotor including a hub and a blade, mounting means for the blade providing freedom for pitch change movement thereof substantially about its longitudinal axis between a position of substantially zero lift and a position of positive pitch for direct take-off greater than the normal autorotational pitch setting, means operative under the influence of centrifugal force tending to move the blade from a lower to a higher pitch setting, a device tending to move the blade from a higher to a lower pitch setting, mechanism for driving the rotor at a higher than normal autorotational rate, means for holding the blade at substantially zero pitch position against the action of centrifugal force during application of the drive, and other means for releasing said holding means when the drive is disconnected, the means operative under the influence of centrifugal force and said device exerting pitch change forces on the blade of such relative magnitude that at a rate of revolution of the rotor substantially in excess of the normal autorotational rate, the action of centrifugal force maintains the blade at a higher pitch setting than the normal autorotational pitch setting and that at substantially normal autorotational rate of revolution, the force of said device is greater than the effect of centrifugal force, whereby the blade is caused to move from the direct take-off pitch setting toward a lower pitch setting.

8. In an aircraft, a normally autorotationally actuable sustaining rotor including a hub and a blade, mounting means for the blade providing freedom for pitch change movement thereof substantially about its longitudinal axis between a position of substantially zero lift and a position of positive pitch for direct take-off greater than the normal autorotational pitch setting, means operative under the influence of centrifugal force tending to move the blade from a lower to a higher pitch setting, a device tending to move the blade from a higher to a lower pitch setting, mechanism for driving the rotor at a higher than normal autorotational rate, means for holding the blade at substantially zero pitch position against the action of centrifugal force during application of the drive, other means for releasing said holding means when the drive is disconnected, the means operative under the influence of centrifugal force and said device exerting pitch change forces on the blade of such relative magnitude that at a rate of revolution of the rotor substantially in excess of the normal autorotational rate, the action of centrifugal force maintains the blade at a higher pitch setting than the normal autorotational pitch setting and that at substantially normal autorotational rate of revolution, the force of said device is greater than the effect of centrifugal force, whereby the blade is caused to move from the direct take-off pitch setting toward a lower pitch setting, and means for arresting movement of the blade from the direct take-off pitch position toward a lower pitch position at a point representing the normal autorotational pitch setting.

9. In a normally autorotationally actuable aircraft sustaining rotor, a hub, a blade, coaxial blade mounting members relatively rotatable substantially about the longitudinal blade axis to provide for pitch change movement from substantially zero position to a position of positive incidence for direct take-off greater than the normal autorotational value, means operative under the influence of centrifugal force for moving the blade from a lower to a higher pitch setting, a pair of levers associated with said members, a device cooperating with said levers for relatively rotating the blade mounting members in a sense to move the blade from a higher to a lower pitch setting, and a releasable locking device for maintaining said members in relative positions representing the autorotational pitch setting thereof.

10. In a normally autorotationally actuable aircraft sustaining rotor, a hub, a blade, coaxial blade mounting members relatively rotatable substantially about the longitudinal blade axis to provide for pitch change movement from substantially zero position to a position of positive incidence for direct take-off greater than the normal autorotational value, means operative under the influence of centrifugal force for moving the blade from a lower to a higher pitch setting, a pair of levers associated with said members, a device cooperating with said levers for relatively rotating the blade mounting members in a sense to move the blade from a higher to a lower pitch setting, a releasable locking device for maintaining said members in relative positions representing the autorotational pitch setting thereof, means normally urging the locking device to locking position, and means providing against locking of said device during movement of the blade from substantially zero pitch position to direct take-off pitch position.

11. In an aircraft, a normally autorotationally actuable sustaining rotor including a hub, and a blade mounted thereon with freedom for movement substantially about its longitudinal axis between a position of substantially zero pitch and a position of positive pitch for direct take-off greater than the normal autorotational value, means operative under the influence of centrifugal force tending to move the blade from a lower to a higher pitch setting, mechanism for driving the rotor, means for holding the blade at substantially zero pitch during application of the drive, a releasable locking device for holding the blade at the autorotational flight pitch, a pilot's control element operative to approximately concurrently disconnect the rotor drive and release the holding means, whereby the blade moves to direct take-off pitch in response to the action of centrifugal force on the means first mentioned, and means for moving the blade from direct take-off pitch to the normal autorotational value.

12. In an aircraft, a normally autorotationally actuable sustaining rotor including a hub, and a blade mounted thereon with freedom for movement substantially about its longitudinal axis between a position of substantially zero pitch and a position of positive pitch for direct take-off greater than the normal autorotational value, means operative under the influence of centrifugal force tending to move the blade from a lower to a higher pitch setting, mechanism for driving the rotor, means for holding the blade at substantially zero pitch during application of the drive, a releasable locking device for holding the blade at the autorotational flight pitch, a pilot's control element operative to approximately concurrently disconnect the rotor drive and release the holding means, whereby the blade moves to direct take-off pitch in response to the action of centrifugal force on the means first mentioned, and means for moving the blade from direct take-off pitch to the normal autorotational value, said last means being automatically operative upon decrease of rotor R. P. M. from a value higher than the normal autorotational rate substantially to said rate.

13. In a normally autorotationally actuable aircraft sustaining rotor, a hub, a blade, coaxial blade mounting members relatively rotatable substantially about the longitudinal blade axis to provide for pitch change movement from substantially zero position to a position of positive incidence for direct take-off greater than the normal autorotational value, means operative under the influence of centrifugal force for moving the blade from a lower to a higher pitch setting, a pair of levers associated with said members, and a device cooperating with said levers for relatively rotating the blade mounting members in a sense to move the blade from a higher to a lower pitch setting.

14. In an aircraft, a normally autorotationally actuable sustaining rotor, including a hub, and a blade mounted thereon with freedom for movement substantially about its longitudinal axis between a position of substantially zero pitch and a position of positive pitch for direct take-off greater than the normal autorotational value, means operative under the influence of centrifugal force tending to move the blade from a lower to a higher pitch setting, mechanism for driving the rotor, means for holding the blade at substantially zero pitch during application of the drive, a releasable locking device for holding the blade at the autorotational flight pitch, and a pilot's control element operative to approximately concurrently disconnect the rotor drive and release the holding means, whereby the blade moves to direct take-off pitch in response to the action of centrifugal force on the means first mentioned.

15. A pitch controlling latch device for a normally autorotationally actuable sustaining blade for an aircraft, said latch device including relatively movable latch elements, the limit of movement of which in one direction represents substantially zero pitch of the blade, and the limit of movement of which in the other direction represents a pitch setting of the blade for direct take-off greater than the normal autorotational pitch setting, means associated with said elements and providing for releasable locking thereof at a point intermediate said limits representing substantially normal autorotational pitch setting, and means providing against operation of the locking means during relative movement of the latch elements from substantially zero pitch position to direct take-off position.

16. In an aircraft, a sustaining rotor including a hub, and a blade mounted thereon with freedom for pitch change movement substantially about its longitudinal axis between a position of substantially zero lift incidence and a position of appreciable positive lift incidence, disconnectible means for driving the rotor, a pilot's control for said means, means automatically operative upon movement of the pilot's control to connect the drive for setting the blade at substantially zero lift incidence, means for moving the blade to a positive lift incidence when the drive is disconnected, and means for moving the blade to and maintaining the blade at an intermediate positive lift incidence position, the last means being automatically operative under the influence of decrease of rotor R. P. M. to a value substantially below the maximum driven rate.

17. In an aircraft, a sustaining rotor including a hub, and a blade mounted thereon with freedom for pitch change movement substantially about its longitudinal axis between a position of substantially zero lift incidence and a position of appreciable positive lift incidence, disconnectible means for driving the rotor, a pilot's control for said means, means automatically operative upon movement of the pilot's control to connect the drive for setting the blade at substantially zero lift incidence, means automatically operative upon movement of the pilot's control to disconnect the drive for moving the blade to a positive lift incident position, and means for moving the blade to and maintaining the blade at an intermediate positive lift incidence position, the last means being automatically operative under the influence of decrease of rotor R. P. M. to a value substantially below the maximum driven rate.

18. In an aircraft sustaining rotor, a blade, means mounting the blade for pitch change movements over a range including a predetermined autorotational setting, a controlling mechanism for the blade pitch including a weight movably carried on the blade and subject to the action of centrifugal force, whereby to control the blade pitch in acordance with the R. P. M. of the rotor, means operative upon radially outward displacement of the weight under the influence of centrifugal force for increasing the blade pitch, a device operating in opposition to the action of centrifugal force on said weight, the weight and said device exerting pitch change moments which are so related to each other that at a higher than normal autorotational R. P. M. the effect of the weight overcomes the effect of said device and that substantially at said autorotational R. P. M. the effect of said device overcomes the effect of said weight, and releasable locking means for retaining the blade at a pitch setting lower than that to which it is movable under the influence of said weight.

19. In an aircraft, a sustaining rotor having a blade mounted for pitch change movement, means operative under the influence of centrifugal force for moving the blade from a lower pitch position to a higher pitch position, mechanism for driving the rotor, and a device for maintaining the blade in a lower pitch position during application of the drive including interconnected toggle levers and a control element therefor operatively associated with the levers at a point intermediate their remote ends, to provide for maintenance of the blade in low pitch position against the action of centrifugal force on said means by application of only a small force through the control element to the levers.

20. In an aircraft sustaining rotor, a hub, a blade mounted thereon with freedom for pitch change movement, mechanism associated with the blade adjacent its root end for moving the blade to different pitch positions, said mechanism including a lever pivotally mounted on the blade and moving therewith during pitch change movement, and means associated with said lever for actuating the pitch change mechanism, said means including a weight movable under the influence of centrifugal force.

21. In an aircraft sustaining rotor, a hub, a blade mounted thereon with freedom for pitch change movement, mechanism associated with the blade adjacent its root end for moving the blade to different pitch positions, said mechanism including a lever pivotally mounted on the blade and moving therewith during pitch change movement, means associated with said lever for actuating the pitch change mechanism, said means including a weight movable under the influence of centrifugal force to effect blade pitch change in one direction, and a device operating in opposition to the action of centrifugal force on said weight for moving the blade to effect blade pitch change in the opposite direction, said weight being of such mass and location that the action of centrifugal force thereon overcomes the effect of said device at a relatively high R. P. M. and that at a lower R. P. M. the effect of said device overpowers the effect of centrifugal force on said weight.

22. In an aircraft sustaining rotor, a hub, a blade mounted thereon with freedom for pitch change movement, mechanism associated with the blade adjacent its root end for moving the blade to different pitch positions, said mechanism including a lever pivotally mounted on the blade and moving therewith during pitch change movement, means associated with said lever for actuating the pitch change mechanism, said means including a weight movable under the influence of centrifugal force to effect blade pitch change from a lower to a higher setting, and a device operating in opposition to the action of centrifugal force on said weight for moving the blade to effect blade pitch change in the opposite direction, said weight being of such mass and location that the action of centrifugal force thereon overcomes the effect of said device at a relatively high R. P. M. and that at a lower R. P. M. the effect of said device overpowers the effect of centrifugal force on said weight.

23. In an aircraft, a normally autorotationally actuable sustaining rotor including a blade mounted for pitch change movement between a position of substantially zero pitch and a positive position for direct take-off appreciably in excess of the substantially normal autorotational pitch setting, means operative under the influence of centrifugal force for moving the blade from a lower to a higher pitch setting, a device operative to move the blade from a higher to a lower pitch setting, releasable means for holding the blade substantially at the normal autorotational pitch setting, a disconnectible drive for the rotor, means for retaining the blade at substantially zero pitch during application of the drive, and controlling mechanism including a control element for connecting and disconnecting the rotor drive, a control element for conditioning said retaining means to retain the blade at zero pitch during application of the drive, and means operative upon movement of the first control element to disconnect the drive to release the second control element and thus provide for movement of the blade to a higher pitch position.

24. In an aircraft, a normally autorotationally actuable sustaining rotor, a blade mounted for pitch change movement between a position of substantially zero pitch and a positive pitch for direct take-off greater than the normal autorotational pitch, the mounting for the blade providing for movement thereof from a lower to a higher pitch position under the influence of centrifugal force, mechanism for moving the blade from a higher to a lower pitch position and for holding the blade in a lower pitch position, said mechanism being operative to overcome the effect of centrifugal force tending to move the blade in the opposite sense substantially at the normal autorotational rate of R. P. M. of the rotor and at speeds below said rate, and being operative to maintain the blade in low pitch position as against the action of centrifugal force even during rotation of the rotor at a speed substantially in excess of the normal autorotational rate but being incapable of overcoming the effect of centrifugal force to move the blade from a higher to a lower pitch position during rotation of the rotor at substantially higher speeds than the normal autorotational rate, driving means for the rotor, and control means providing for operation of said device to hold the blade in a low pitch position during application of the drive, and releasing of said device upon disconnection of the drive, and for reconditioning of said device to exert a force tending to move the blade from a higher to a lower pitch position after the drive has been disconnected, whereby, in effecting the direct take-off maneuver, the rotor may be driven at a higher than normal autorotational rate with the blade at substantially zero pitch, the drive may be disconnected and said device released so that centrifugal force will move the blade from the zero to the direct take-off pitch position, and the said device may be reconditioned to exert a force tending to move the blade from direct take-off pitch to a lower pitch so that upon decrease of rotor speed to the substantially normal autorotational rate the blade pitch will be reduced.

25. An aircraft in accordance with claim 24 and further including means for arresting movement of the blade during its movement from the direct take-off pitch position to a position of decreased incidence at the substantially normal autorotational pitch.

26. An aircraft in accordance with claim 24 in which the control means includes a pilot's control member common to the drive for the rotor and to said device for moving the blade from a higher to a lower pitch position.

27. An aircraft in accordance with claim 24 in which the control means includes a pilot's control member common to the drive for the rotor and to said device for moving the blade from a higher to a lower pitch position movable in one sense to connect the drive and in another sense to disconnect the drive and further including means associated with the pilot's control member and operated thereby during its movement in the latter sense to release said device and thus permit the action of centrifugal force to move the blade from a higher pitch to a lower pitch position.

28. An aircraft in accordance with claim 24 and further including a releasable lock for arresting movement of the blade during its movement from the direct take-off position to a position of decreased incidence at the substantially normal autorotational pitch, together with means normally urging the lock to locking position.

29. An aircraft in accordance with claim 24 in which the control means includes a pilot's control member common to the drive for the rotor and to said device for moving the blade from a higher to a lower pitch position and further including means for arresting movement of the blade during its movement from the direct take-off pitch position to a position of decreased incidence at the substantially normal autorotational pitch.

30. In an aircraft sustaining rotor, a blade, means mounting the blade for pitch change movements, and a controlling mechanism for the blade pitch including a weight movably carried on the rotor and subject to the action of centrifugal force to vary the blade pitch in accordance with the R. P. M. of the rotor, and releasable locking means inherently acting to maintain a given blade pitch value irrespective of rotor R. P. M.

31. In an aircraft sustaining rotor, a blade, means mounting the blade for pitch change movements, and a controlling mechanism for the blade pitch including a weight movably carried on the rotor and subject to the action of centrifugal force to vary the blade pitch in accordance with the R. P. M. of the rotor, means operative upon radially outward displacement of the weight under the influence of centrifugal force for increasing the blade pitch, and releasable locking means inherently acting to maintain a given blade pitch value irrespective of rotor R. P. M.

32. In an aircraft sustaining rotor, a blade, means mounting the blade for pitch change movements over a range including a predetermined autorotational setting, and a controlling mechanism for the blade pitch including a weight movably carried on the rotor and subject to the action of centrifugal force to vary the blade pitch in accordance with the R. P. M. of the rotor, means operative upon radially outward displacement of the weight under the influence of centrifugal force for increasing the blade pitch, and a device operating in opposition to the action of centrifugal force on said weight, the weight and said device exerting pitch change moments which are so related to each other that at a higher than normal autorotational R. P. M. the effect of the weight overcomes the effect of said device and that substantially at said autorotational R. P. M. the effect of said device overcomes the effect of said weight, and means normally setting a predetermined limit upon the movement of the blade by said device, which limit is above said autorotational setting.

33. A pitch controlling latch device for an autorotationally actuable sustaining blade for an aircraft, said latch device including relatively movable latch elements, the limit of movement of which in one direction represents substantially zero pitch of the blade, and the limit of movement of which in the other direction represents a pitch setting of the blade for direct take-off greater than the normal autorotational pitch setting, means associated with said elements and providing a stop for movement thereof at a point representing an autorotational pitch setting intermediate said limits, and means providing against operation of the stop during relative movement of the latch elements from substantially zero pitch position to direct take-off position.

HARRIS S. CAMPBELL.